CERTAIN 2-THIAZOLINEALKANOIC ACIDS AND ESTERS

This invention relates to novel nitrogen and sulfur containing heterocyclic compounds. In particular it concerns 2-cycloalkyl or aryl-4-hydroxy-5-aryl-2-thiazoline-4-alkanoic acids which in standard pharmacological test procedures with laboratory animals exhibit usefulness as anti-inflammatory agents. The compounds are also useful in the preparation pharmacologically active 2-cycloalkyl or aryl-5-aryl- thiazole-4-alkanoic acids.

The invention provides novel 4-hydroxy-thiazoline-4-alkanoic acids and their esters of general formula I

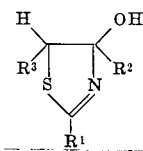

wherein $R^1$ is selected from the group consisting of cycloloweralkyl, phenyl, substituted phenyl such as loweralkylphenyl, loweralkoxyphenyl, halophenyl, nitrophenyl, diloweralkylaminophenyl and triflouromethylphenyl, naphthyl and heterocyclyl such as thienyl and furyl; $R^3$ is selected from the group consisting of phenyl, substituted phenyl such as loweralkylphenyl, loweralkoxyphenyl, halophenyl, nitrophenyl, diloweralkylaminophenyl and trifluoromethylphenyl, naphthyl and heterocyclyl such as thienyl and furyl; and $R^2$ is a group selected from lower alkanoic acid residues and their lower alkyl esters; and acid addition salts thereof.

The terms "loweralkyl," "loweralkoxy" and the like are meant to include both branched and straight chain moieties having from one to about six carbon atoms.

The compounds of general formula I, in the form of a hydrohalide may be prepared by reacting a compound of the general formula

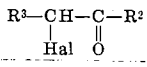

with a thioamide of the general formula

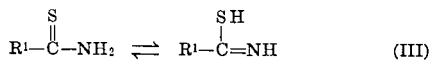

where $R^1$, $R^2$ and $R^3$ have the meanings defined above and Hal is a halogen atom under mild conditions. The temperatures used for the reaction must be below the dehydration temperature of the thiazoline hydrohalide. The optimum temperature will therefore depend on the particular reactants used and temperatures below 50° C. such as room temperature are preferred. It is also preferable to carry out the reaction in an inert organic solvent in which the thiazoline hydrohalide is insoluble. If $R^2$ is an aliphatic acid group and if the reaction is carried out in a lower alkanol such as isopropanol in the presence of a base such as an alkali metal carbonate, the free thiazoline aliphatic acid can be obtained. On the other hand it is generally more convenient to use a reactant in which $R^2$ is a lower alkyl ester of an aliphatic acid, e.g. the ethyl ester. Conveniently equimolar amounts of the reactants are used and the reaction mixture is heated to the required temperature or in some cases is merely kept at room temperature for a short time or overnight. The thiazolines provided by the invention can be separated in known manner, e.g. by filtration, and the filtrate may be acidified to precipitate additional product.

Three bases of the thiazolines can be prepared from the hydrohalides by treatment with a base, e.g. with an alkali metal carbonate.

The starting compounds II employed in the above reaction are either commercially available or are readily prepared by organic procedures well known to the art.

In the preparation of 4-hydroxy-thiazoline-4-acetic acids the γ-haloacetoacetic acid is, of course, protected in conventional manner to prevent decarboxylation and after the cyclization reaction the protecting group is conventionally removed, for instance using a benzyl ester which is removed by catalytic hydrogenation.

When the 4-hydroxy-thiazolines of the invention are employed as intermediates to prepare the corresponding thiazoles, they can be dehydrated by heating to above the dehydration temperature, particularly in the presence of an acid. The 4-hydroxythiazolines of the invention are readily dehydrated on heating when in the form of a hydroacid salt, the free bases being more stable. Dehydration may be effected by refluxing the compound in the presence of an organic solvent in the presence of a sulfonic acid, e.g. benzene sulfonic acid or P-toluene sulfonic acid using a water separator until water is no longer evolved or more simply by heating in an alkanoic acid such as glacial or aqueous acetic acid. When the reaction is complete the thiazole can be recovered conventionally, for instance the reaction mixture can be evaporated to reduce volume and the product crystallized from a solvent, for instance an alcohol. The thiazoles in general are anti-inflammatory agents when tested on warm-bloded animals such as by the test of Winter et al. in Proc. Soc. Biol. Med. III, 544 (1962) and Buttle et al. in Nature, 179, 629 (1957).

As the compounds of general formula (I) generally show pharmaceutical activity, for example, anti-inflammatory activity, the invention provides a pharmaceutical composition comprising a compound of general formula (I), or an acid addition salt thereof, and a pharmaceutically acceptable carrier.

When the compounds of this invention are employed as anti-inflammatory agents they can be administered to warm-bloded animals, e.g. mice, rats, rabbits, dogs, cats, monkeys, etc. alone or as a pharmaceutical composition in combination with pharmaceutically acceptable carriers. The carrier may be solid, liquid or creamlike and any suitable carrier known to the art can be used. The composition can be in unit does form, for example as tablets or capsules or it can be in the form of a solution. The compositions can be administered orally or parenterally by injection of the composition can, for parenteral administration, be in the form of a sterile solution or suspension containing other solutes, for example enough saline or glucose to render the solution isotonic. The particular carrier and proportion of carrier to active compound will be determined by the nature of the compound, the chosen route of administration and standard pharmaceutical practice.

The dosage of the thiazoline will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The following Examples illustrate the invention:

Example 1

Ethyl 2,5-diphenyl-4-dydroxy-2-thiazoline-4-acetate

A mixture of ethyl 4-bromo-3-oxo-4-phenylbutyrate (7.12 g.), thiobenzamide (3.4 g.) and anhydrous sodium carbonate (1.2 g.) in ethanol (50 ml. 95%) is stirred at 60-70° for 5 hours. The mixture is then evaporated, and the organic material taken up in ether. The ether solution is washed with water, 2N hydrochloric acid, water, dried (MgSO₄) and evaporated to give an oil (6.0 g.) which is chromatographed on alumina. Elution with benzene gives the desired ester as a crystalline white solid (1.8 g., 21%) m.p. 90°-91°C.

Analysis: Found: C, 66.8; H, 5.5; N, 4.1; S, 9.6. $C_{19}H_{19}NO_3S$ requires C, 67.0; H, 5.3; N, 4.1; S, 9,4%.

In a similar manner, the following reactants give the products indicated:

United States Patent

[11] 3,607,879

| [72] | Inventor | Robert Anthony Newberry<br>Bourne End, England |
|---|---|---|
| [21] | Appl. No. | 814,445 |
| [22] | Filed | Apr. 8, 1969 |
| [45] | Patented | Sept. 21, 1971 |
| [73] | Assignee | John Wyeth & Brother Limited<br>Berkshire, England |
| [32] | Priority | Apr. 9, 1968 |
| [33] | | Great Britain |
| [31] | | 16909/68 |

[54] CERTAIN 2-THIAZOLINEALKANOIC ACIDS AND ESTERS
10 Claims, No Drawings

[52] U.S. Cl. .................................................... 260/306.7,
260/332.2 A, 260/347.3, 260/347.4, 260/469,
260/471 R, 260/473 R, 260/476 R, 260/515 R,
260/515 A, 260/518 R, 260/521 R, 260/521 A,
424/270

[51] Int. Cl. ........................................................ C07d 91/24
[50] Field of Search ................................................ 260/306.7

[56] References Cited
UNITED STATES PATENTS
3,225,045  12/1965  Walker ........................ 260/306.7

*Primary Examiner*—Alex Mazel
*Assistant Examiner*—R. J. Gallagher
*Attorney*—Dwight J. Potter

ABSTRACT: This invention concerns 2,5-dicyclyl-4-hydroxy-2-thiazoline-4-alkanoic acids which are pharmacologically efficacious as anti-inflammatory agents and which are useful as intermediates in the preparation of the corresponding thiazoles.